May 13, 1930.                    A. LIBECK                    1,758,120
               LUMINOUS AND ANIMATED ADVERTISING DEVICE
                         Filed Feb. 18, 1929
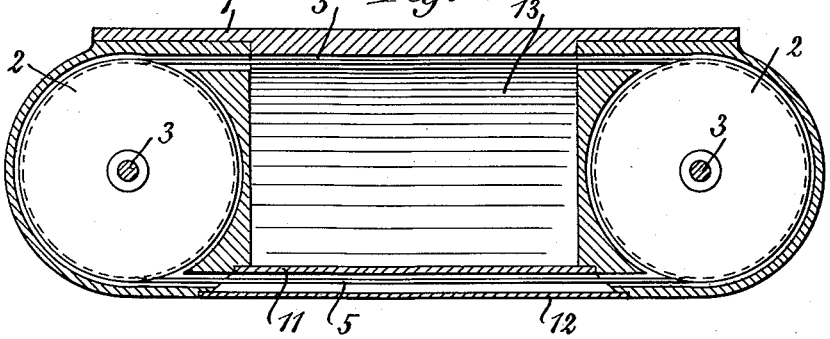
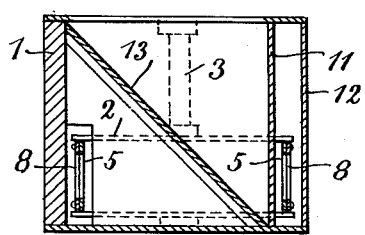
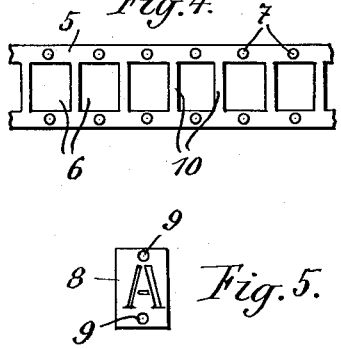
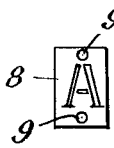
Inventor:
Auguste Libeck.

Patented May 13, 1930

1,758,120

UNITED STATES PATENT OFFICE

AUGUSTE LIBECK, OF PARIS, FRANCE

LUMINOUS AND ANIMATED ADVERTISING DEVICE

Application filed February 18, 1929, Serial No. 340,885, and in France November 13, 1928.

This invention relates to a luminous and animated device illuminated by the light of day.

In order to make my invention more clearly understood, I have illustrated, as an example, an embodiment thereof in and by a drawing appended hereto and wherein:

Fig. 1 is an elevation of a device constructed according to my invention;
Fig. 2 is a longitudinal section; and
Fig. 3 a cross section of the same; while
Figs. 4 and 5 show details thereof.

The apparatus or device is composed of a casing 1 inside each end of which a pulley 2 is keyed on a spindle 3 fitted with a grooved pulley 4 or with any other suitable transmission member. On said two pulleys 2—2 runs an endless steel strip 5 through which apertures 6 are provided. The steel strip, which is highly pliant, carries two rows of studs 7 whereon plates 8, also made of pliant steel, are adapted to be secured. Said plates have two securing holes 9 while their middle part carries letters or numerals perforated therethrough. The edges of plates 8 are covered by scales 10 of the steel strip 5 which prevent light from passing through.

Through the front of casing 1 is provided an aperture wherein is set a coloured glass 11 in front of which the steel strip travels and a neutral glass 12 may be arranged for protection in front of the steel strip.

Inside the casing 1 set aslant a mirror 13 which reflects the light of day through the perforated signs so that, obviously, I have but to cause pulleys 2 to be actuated by an electric motor or any other suitable means in order to obtain a luminous and animated advertising display.

I claim:

A luminous and animated advertising device comprising a casing having a glass front, a pair of pulleys supported rotatably within said casing, an endless flexible strip formed with apertures and mounted on said pulleys so that it can be moved thereby behind the glass front, a series of plates bearing transparent signs, means for connecting said plates to the strip so as to cover its apertures, a light reflector arranged so as to direct light through the strip and through the glass front, and a coloured screen arranged between the reflector and the strip.

AUGUSTE LIBECK.